UNITED STATES PATENT OFFICE.

WILLIAM MORRISON, OF DES MOINES, IOWA.

PROCESS OF BINDING THE ACTIVE MATERIAL OF POSITIVE-POLE LEAD ELECTRODES.

1,021,993.  Specification of Letters Patent.  Patented Apr. 2, 1912.

No Drawing.   Application filed February 23, 1912.  Serial No. 679,300.

*To all whom it may concern:*

Be it known that I, WILLIAM MORRISON, a citizen of the United States, residing at Des Moines, in the county of Polk and State of Iowa, have invented certain new and useful Improvements in Processes of Binding the Active Material of Positive-Pole Lead Electrodes, of which the following is a specification.

This invention relates to the production of a permanent and insoluble binder for the active material of the positive-pole electrodes of lead storage batteries. This binder fundamentally comprises an oxygen compound of a metal incapable of directly replacing hydrogen in a sulfuric acid solution; insoluble by anodic oxidation in a sulfuric acid solution; incapable of cathodic reduction to metal, or of electrolytic separation as metal, in a sulfuric acid solution; and capable of forming complex anions with electronegative elements, which can constitute the acidic radical of compounds having lead as a base. The three known metals which have these characteristics are tungsten, tantalum and niobium, otherwise called columbium.

To illustrate the invention, there will be described a process of producing a lead-peroxid electrode employing a compound of tungsten as the binder. For this purpose, a metallic support, for example a grid of antimonial lead, is pasted or filled with the usual mixture of minium, litharge and a sulfuric acid solution, in which mixture lead sulfate forms as a provisional binder. Complete formation, or peroxidation, of the active material is then preferably initially effected by placing the pasted grids, alternately with unfilled grids serving as dummy electrodes of the opposite polarity, in a sulfuric acid solution having a specific gravity of 1.200 to 1.250 and passing an electric current through the solution, alternately in opposite directions, until the paste has been sufficiently expanded, care being taken not to force the discharge beyond the normal intended capacity of the electrodes. Sodium paratungstate is now dissolved in a ten-volume aqueous solution of hydrogen peroxid, that is to say a solution capable of liberating ten volumes of oxygen, and there is then added slowly and with constant stirring a sulfuric acid solution having a specific gravity of 1.200 to 1.225 until effervescence ceases. There is then added an additional and preferably an equal amount of said sulfuric acid solution, and the formed positive electrode is dipped in the solution, then removed and permitted to dry with exposure to air, and again dipped and dried one or more times as may be desired.

One effect of the hydrogen peroxid as above used is to prevent precipitation of tungstic acid upon the addition of the sulfuric acid; and if any tendency to such precipitation is observed, more hydrogen peroxid should be added until the solution remains clear. The hydrogen peroxid is used in some excess, and serves also in the presence of the sulfuric acid to reduce the lead peroxid of the formed electrode, and thereby to facilitate the ultimate production of the lead - tungsten - oxygen binder. If stronger hydrogen peroxid solutions are used a correspondingly smaller volume will be required. The positive-pole electrode should then receive a prolonged and strong charging treatment in sulfuric acid, with dummy negatives, before assembling in the battery, in order to remove or to render insoluble any remaining soluble components of the plate.

The tungsten-oxygen compound appears to play the same rôle in the binder compound as does the sulfur-oxygen compound in the ordinary lead electrodes in which lead sulfate constitutes the binder. The lead-tungsten-oxygen compound is however, as compared with the lead sulfate heretofore commonly used as a binder, very permanent and insoluble, being chemically and electrochemically inert under the conditions of use, while acting as an efficient binder. This binder, by reason of its inactivity, somewhat decreases the capacity of the electrodes, to the same extent that it displaces or occupies the place of lead peroxid.

The initial formation of the electrodes may be omitted and the filled grids may be at once placed in the tungstate solution to impregnate the active material with the binder, formation being subsequently effected. Such subsequent formation, however, consumes a much larger amount of current than does initial formation.

Positive-pole electrodes having a binder containing tantalum or niobium may be prepared by the method above described, a soluble tantalate or niobate, as for example potassium hexa-tantalate or niobate, being substituted for the sodium paratungstate.

The active material of Planté electrodes, formed out of solid lead, may also be bound by dipping them in a hydrogen peroxid solution of a salt of the binder-metal, and then completing the treatment as before.

I claim:

1. The process of binding the active material of positive-pole lead electrodes, which consists in dissolving in a solution of a reducing agent a compound having in its acidic radical a metal incapable of directly replacing hydrogen in a sulfuric acid solution; insoluble by anodic oxidation in a sulfuric acid solution; incapable of cathodic reduction to metal, or of electrolytic separation as metal, in a sulfuric acid solution; and capable of forming complex anions with electronegative elements, which can constitute the acidic radical of compounds having lead as a base, adding sulfuric acid, and saturating the active material with the resultant solution.

2. The process of binding the active material of positive-pole lead electrodes, which consists in dissolving in a solution of hydrogen peroxid a compound having in its acidic radical a metal incapable of directly replacing hydrogen in a sulfuric acid solution; insoluble by anodic oxidation in a sulfuric acid solution; incapable of cathodic reduction to metal, or of electrolytic separation as metal, in a sulfuric acid solution; and capable of forming complex anions with electronegative elements, which can constitute the acidic radical of compounds having lead as a base, adding sulfuric acid, and saturating the active material with the resultant solution.

3. The process of binding the active material of positive-pole lead electrodes, which consists in dissolving in a solution of a reducing agent a compound having tungsten in its acidic radical, adding sulfuric acid, and saturating the active material with the resultant solution.

4. The process of binding the active material of positive-pole lead electrodes, which consists in dissolving in a solution of hydrogen peroxid a compound having tungsten in its acidic radical, adding sulfuric acid, and saturating the active material with the resultant solution.

In testimony whereof I affix my signature in presence of two witnesses.

WILLIAM MORRISON.

Witnesses:
 EUGENE A. BYRNES,
 N. P. LEONARD.

---

Copies of this patent may be obtained for five cents each, by addressing the "Commissioner of Patents, Washington, D. C."